Sept. 27, 1949.  E. S. JOHNSON ET AL  2,483,204
GROUND LEVELING ATTACHMENT FOR CULTIVATORS
Filed Nov. 8, 1947  2 Sheets-Sheet 1

INVENTOR
EARL S. JOHNSON
ALF J. ANDERSON
BY Paul, Paul & Moore
ATTORNEYS

Sept. 27, 1949.   E. S. JOHNSON ET AL   2,483,204
GROUND LEVELING ATTACHMENT FOR CULTIVATORS
Filed Nov. 8, 1947   2 Sheets-Sheet 2
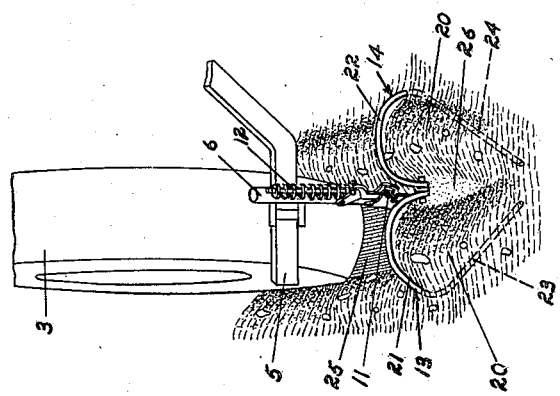
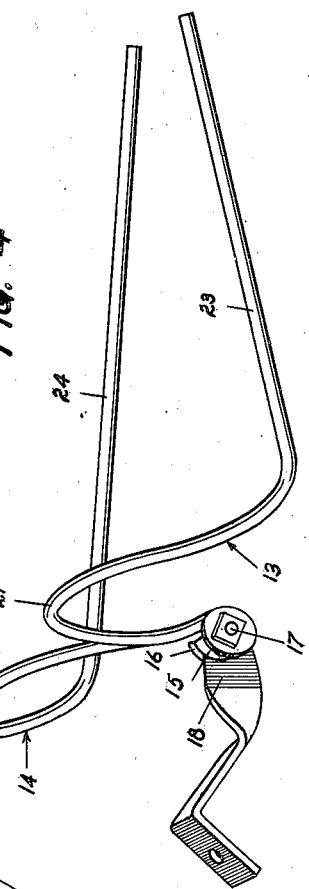
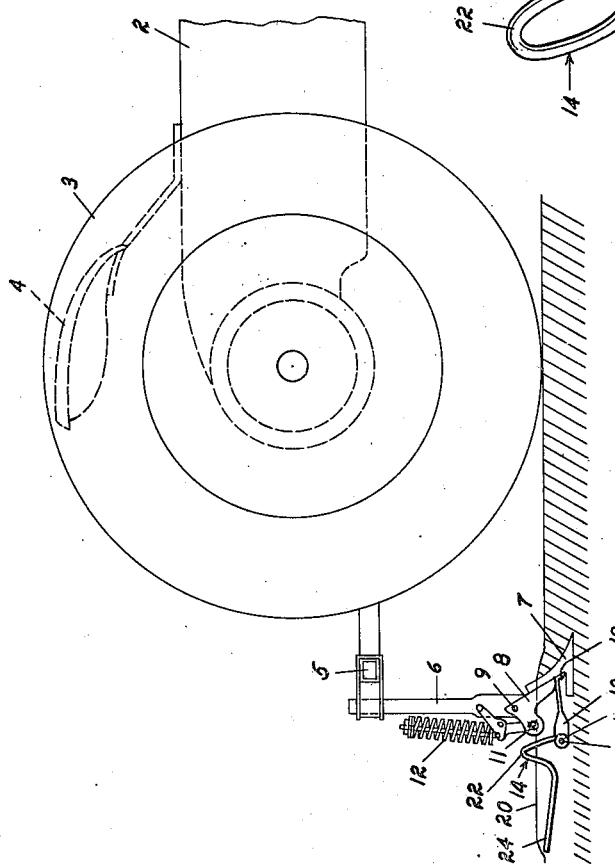
INVENTOR
EARL S. JOHNSON
ALF J. ANDERSON
BY Paul, Paul & Moore
ATTORNEYS Patented Sept. 27, 1949

2,483,204

UNITED STATES PATENT OFFICE 2,483,204

GROUND LEVELING ATTACHMENT FOR CULTIVATORS

Earl S. Johnson and Alf J. Anderson, Minneapolis, Minn., assignors to Better-Bilt Manufacturing Company, Minneapolis, Minn., a partnership Application November 8, 1947, Serial No. 784,840

4 Claims. (Cl. 97—56)

This invention relates to new and useful improvements in attachments for cultivators, and more particularly to a ground leveling device adapted to be used in combination with the usual shoes of a cultivator to level the ground following the shoes.

It is well known when cultivating crops that the shoes of a cultivator usually leave furrows or ridges along the surface of the ground in the direction of cultivator travel. Such alternate furrows and ridges are sometimes objectionable, particularly if the soil is rather firm, as it may then impart a more or less bouncing action to the tractor as it travels over such furrows and ridges. Such alternate furrows and ridges may also tend to stimulate soil erosion. It is therefore desirable that means be provided whereby the usual furrows made by the shovels of a cultivator may be substantially filled immediately following the shovel, whereby the surface of the ground may be made substantially level, thereby to simplify cross-cultivating and whereby the operation of steering a tractor is made much simpler.

An object is to provide an attachment for cultivator shovels which not only fills the furrow back of the shovel, but also thoroughly mulches and aerates the soil.

Other objects of the invention reside in the simple and inexpensive construction of the device whereby it may be manufactured at extremely low cost, and also whereby it may be quickly attached to a conventional cultivator shoe or its support without the use of special tools and without requiring any alterations in the construction of the cultivator.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 2 is a perspective view showing the ground leveling device removed from the cultivator shoe;

Figure 3 is a side view of a portion of a tractor showing a cultivator shoe carried by the usual draw bar of the tractor and said shoe having a ground leveling device attached thereto;

Figure 4 is a perspective view of a portion of a tractor having the ground leveling device secured to the usual shovel thereof and showing the action of said device in the soil as the tractor advances.

Figures 1, 5:
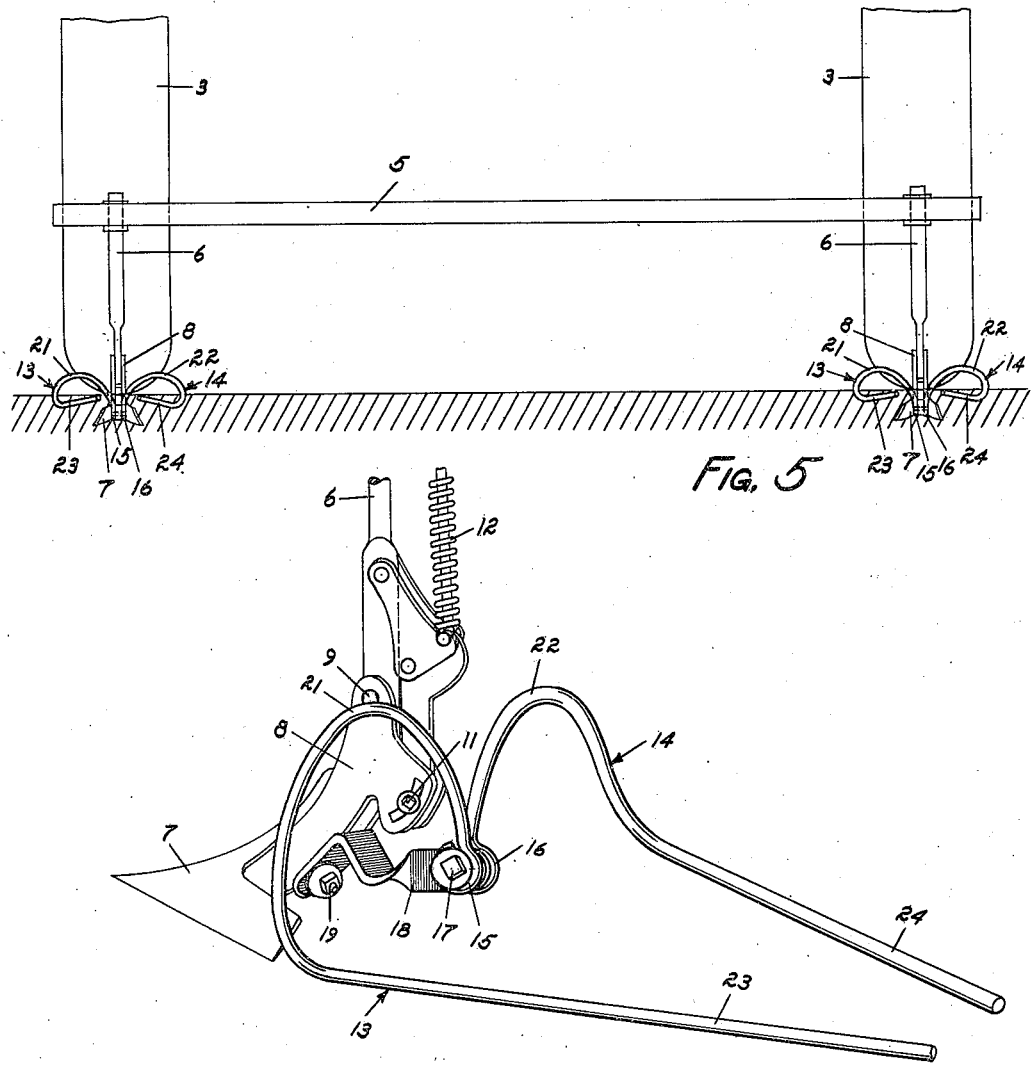
Figure 1 is a perspective view showing the ground leveling device attached to the supporting means or shank of a conventional cultivator shoe.
Figure 5 is a more or less schematic view showing in part the rear of a tractor with the invention attached thereto.

In the selected embodiment of the invention herein disclosed, there is illustrated in Figure 3 a portion of a tractor body 2, including the usual tractor wheels 3, driver's seat 4, and draw bar 5 to which the shank 6 of a conventional cultivator shoe 7 may be adjustably secured by means well known in the art.

The cultivator shoe 7 herein disclosed is shown detachably secured to a mounting bracket 8, pivotally mounted on the lower end of the shank 6 by a pivot pin 9 and having a lock screw 11 for securing the bracket in adjusted position upon the shank 7. A suitable relief spring 12 is shown operatively associated with the cultivator shoe to permit the latter to yield in the event it strikes an obstruction, thereby to protect the parts against breakage. All of the above described parts are old and well known in the art.

An important feature of the present invention resides in the provision of a device for leveling the ground following the cultivator. It is well known that cultivator shoes, particularly the larger sizes, have a tendency to leave rather prominent furrows in the surface of the ground, whereby the entire surface of a cultivated field may be covered with alternate furrows and ridges which may, in some instances, be found objectionable when cross-cultivating. If the ground or soil is of a clay composition, it may be very firm whereby when the tractor crosses the furrows and ridges produced by the cultivator, it may be rather rough going for the tractor, in that a bouncing action is imparted thereto as a result of traversing said furrows and ridges, which may in some instances tend to disrupt the action of the cultivator shoes in the ground.

The novel ground leveling device herein disclosed serves to substantially fill the furrows made by the cultivator shoes and, at the same time, the soil is thoroughly mulched and aerated by said device which levels the surface of the cultivated ground, and, in addition, minimizes soil erosion and stimulates plant growth.

The ground leveling device is shown comprising a pair of opposed members 13 and 14 shown constructed of metallic rods having sufficient resiliency to protect them against breakage or bending in the event they may strike an obstruction in the ground. The particular cross-section of the members 13 and 14 is of minor importance, the round stock being preferred, however, because of its relatively greater self-cleaning characteristics.

The members 13 and 14 are provided at their forward ends with eyes 15 and 16, respectively, adapted to receive an anchoring bolt 17 which traverses the eyes 15 and 16, and an aperture provided in the rear end of a mounting bracket 18, clearly illustrated in Figures 1 and 2.

The mounting bracket 18 may be formed of strap metal, and is shown having its forward end shaped to fit against the rear lower portion of the bracket 8 of the cultivator supporting shank 6, and secured thereto by the usual bolt 19 which detachably secures the shoe 7 to the bracket 8.

The ground engaging members 13 and 14 have portions 21 and 22, respectively, which extend upwardly and outwardly in opposite directions, and thence downwardly to points adjacent to the level of the securing bolt 17, from whence they extend rearwardly in the form of elongated substantially horizontally disposed end portions 23 and 24, respectively, as best shown in Figures 1 and 2. The end portions 23 and 24 are disposed at an incline to the path of travel of the cultivator shoe 7, whereby they direct the soil constituting the ridges 20, into the furrow, as illustrated in Figure 4 to thereby substantially fill the furrow and level the ground surface.

The securing bolt 17 provides means whereby the horizontal end portions 23 and 24 of the leveling device may be adjusted with respect to the horizontal, thereby to obtain the most desirable effects. By thoroughly mulching and aerating the soil, following the cultivator shoes, as herein disclosed, the usual furrows and ridges made by the cultivator shoes are completely eliminated which also greatly helps to eliminate erosion and to conserve moisture.

In actual practice, it has been found that by the use of the novel ground leveling device herein disclosed, during the cultivating season, the crop yield may be greatly improved as a result of the periodic mulching and aerating of the soil. The construction of the device is extremely simple, as will readily be noted by reference to the application drawings, and the operation of attaching it to a cultivator shoe is an extremely simple one, as will readily be noted. In some instances it may be necessary to slightly vary the shape of the bracket 18 to adapt the device for mounting on different types and makes of cultivator shoes, but the action of the device remains the same regardless of the type of cultivator or cultivator shoe with which it may be used.

Figure 4 clearly illustrates the action of the invention. When used in conjunction with a tractor, a cultivator shoe 7 may be attached to the drawbar 5 directly behind each tractor wheel 3 to loosen up the soil in the tracks 25, left by said wheels. To eliminate ridges, a ground leveling device such as herein disclosed, is attached to each shoe 7, or its supporting means, and serve to inwardly move the loose soil dug up by the shoes and thereby fill the furrows 26 and thus substantially level the surface of the ground, following the cultivator, whereby the soil is thoroughly aerated and left in a condition to readily absorb moisture, even when subjected to heavy rains.

It will be apparent to those skilled in the art that we have accomplished at least the principal objects of our invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that our invention is not limited thereto.

We claim as our invention:

1. The combination with a cultivator shoe having a supporting shank having means at its lower end for securing the shoe thereto, of a ground leveling device comprising a resilient rod-like member having its forward end only secured to a support attached to the rear of said shank, said member extending upwardly, outwardly and downwardly from said support and terminating in a rearwardly and inwardly extending straight portion which straight portion is adapted to inwardly move the soil at the side of a furrow left by the cultivator shoe, thereby to substantially level the ground surface traversed by said member.

2. The combination with a cultivator shoe having a supporting shank having means at its lower end for securing the shoe thereto, of a ground leveling device comprising a pair of resilient rod-like members having their forward ends only secured to a support attached to the rear of said shank, said members extending upwardly, outwardly and downwardly from said support and each terminating in a rearwardly and inwardly extending straight portion which straight portions are adapted to engage the ridges of soil at the sides of a furrow left by said cultivator shoe and inwardly move the soil to fill the furrow and level the ground surface following the cultivator shoe.

3. The combination with a cultivator shoe having a supporting shank having means at its lower end for securing the shoe thereto, of a ground leveling device comprising a pair of resilient rod-like members having eyes formed at their forward ends, a bracket attachable to the rear of said shank and to which the forward ends of said members are adjustably secured, said members extending upwardly, outwardly, and downwardly from said bracket and having elongated rearwardly and inwardly extending rear portions positioned to engage the ridges of soil at the side of a furrow left by said cultivator shoe, thereby to mulch and inwardly move portions of said soil to substantially fill the furrow and level the ground surface following the cultivator shoe.

4. A ground leveling attachment for a cultivator shoe comprising a pair of opposed resilient rod-like members having their forward ends adjustably secured to a mounting bracket attached to the rear of said cultivator shoe, said rods each having portions thereof extending upwardly, outwardly and downwardly in wide sweeping curves, and rearwardly and inwardly, each of said rearwardly extending portions cooperating to inwardly direct the soil at the sides of a furrow left by the cultivator shoe, thereby to substantially level the ground following the cultivator shoe.

EARL S. JOHNSON.
ALF J. ANDERSON.

(References on following page)

REFERENCES CITED

The following references are of record in the file of this patent:

UNITED STATES PATENTS

| Number | Name | Date |
|---|---|---|
| 324,480 | Pates | Aug. 18, 1885 |
| 593,493 | Powell | Nov. 9, 1897 |
| 764,525 | Ezzell | July 5, 1904 |
| 998,060 | Weikert | July 18, 1911 |
| 1,693,318 | Shell | Nov. 27, 1928 |
| 2,178,469 | Burke | Oct. 31, 1939 |
| 2,307,533 | Neumann et al. | Jan. 5, 1943 |
| 2,424,014 | Bobeldyk | July 15, 1947 |